May 6, 1947.  C. W. YELM  2,420,278
METHOD OF CURING V-TYPE BELTS
Filed May 27, 1946
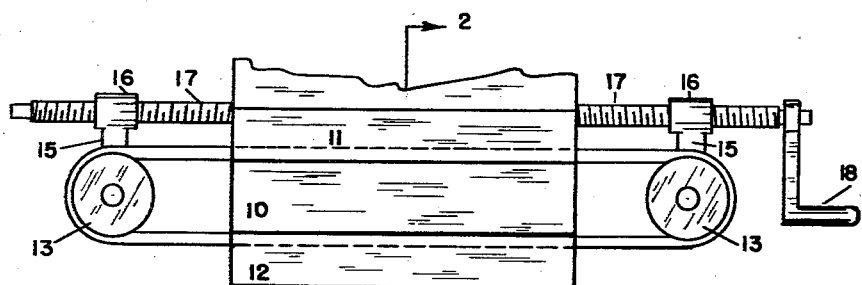
FIG. 1
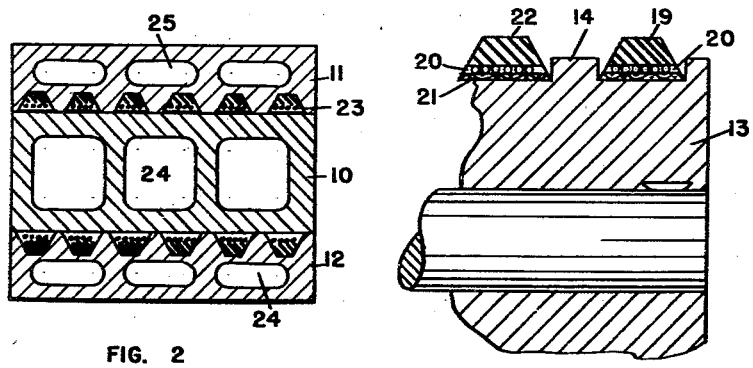
FIG. 2
FIG. 3
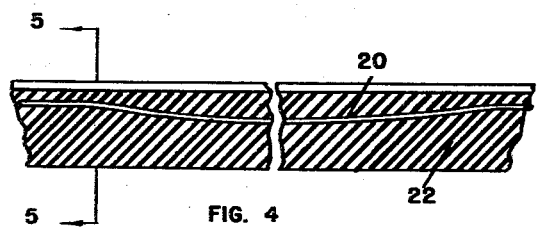
FIG. 4
FIG. 5
INVENTOR.
CHARLES WALTER YELM
BY Martin E. Anderson
ATTORNEY Patented May 6, 1947

2,420,278

UNITED STATES PATENT OFFICE 2,420,278

METHOD OF CURING V-TYPE BELTS

Charles Walter Yelm, Denver, Colo., assignor to The Gates Rubber Company, Denver, Colo., a corporation of Colorado Application May 27, 1946, Serial No. 672,679

3 Claims. (Cl. 18—48)

1

This invention relates to improvements in methods for curing belts of the V-type.

The use of cables, such as stranded steel wire, for tension members in V-type belts intended for high duty, is quite prevalent. Where endless belts of considerable length are manufactured, it is not practical to cure them in the ordinary circular belt curing mold. It has long been the practice to cure long endless belts in sectional molds. With this method belts of any length can be cured and the same molds can be used for belts varying greatly in length.

In the usual method of curing V-type belts in sectional molds, the belts are positioned over spaced pulleys and have heretofore been positioned with the narrow side of the belt towards the pulley. Since the body of the belt between the tension layer and the narrow inner surface is composed of uncured rubber composition, and since it is necessary to put the belt under considerable tension during the curing operation, experience has shown that the cables will cut into the body of the belt where it passes around the pulleys and will therefore move from its original position with the result that the tension layer will be distorted so that, at those points that were around the pulley in the uncured state of the belt, the tension layer will be closer to the inner surface than in other parts of the belt. This distortion introduces an objectionable feature which it is highly desirable to remove.

In addition to the distortion mentioned in the above paragraph, namely, the uniform movement of the tension layer towards the inner surface of the belt, it also happens that in many cases the tension layer will move different distances along its two edges and therefore, instead of the tension layer being the same distance from the outer surface at all points, will vary. This also is an objectionable feature which it is desired to eliminate.

Belts of the type to which this invention relates are usually provided on their outer or wide surfaces with one or two layers of rubberized fabric, preferably bias cut. The tension layer is separated from the fabric by a comparatively thin layer of rubber composition.

It is now apparent that if the belt is applied to the pulleys so as to bring the wide surface of the belt against the convex surface of the pulley, a greater amount of tension can be applied without any danger of distorting the tension cable layer, because it cannot cut into the fabric for the rubber composition between the cables and

2 the fabric is comparatively thin. It has been found that belts cured in an inverted position like that explained, will be entirely uniform throughout their entire length with respect to the position of the tension cable layer.

Having thus described the objects sought to be obtained and in a general way the invention itself, the invention will now be described in greater detail and for this purpose reference will be had to the accompanying drawing in which:

Figure 1 shows a side view of a sectional curing mold, the parts being shown in more or less diagrammatic manner for purposes of illustration only;

Figure 2 is a section taken on line 2—2, Figure 1; and

Figure 3 is a section through a pulley showing the construction of the latter and the arrangement of the belt thereon.

In the drawing reference numeral 10 designates the center platen of a sectional curing mold, reference numeral 11 designates the top platen and reference numeral 12 the bottom platen. The two elongated multiple rollers have been designated by reference numeral 13. These rollers are of considerable length and are shrouded having division walls 14, as shown more particularly in Figure 3. They are mounted on bearings which, for the purposes of illustration are supposed to be at the lower ends of brackets 15. The upper ends of brackets 15 are formed into hubs 16 that are threaded for the reception of a threaded rod 17. Rod 17 can be rotated by means of a crank 18. In the example shown in Figure 1, the threaded rods 17 are provided with right and left hand threads at opposite ends so that the bearings will move in opposite directions while the rods turn in the same direction. As above explained, it is not the intention to describe in detail the construction of a sectional mold as they are old and well known and the one shown in Figure 2 is merely illustrative and intended to show the different elements in the relationship that they have in the actual machine. The belt to be cured has been designated by reference numeral 19 and has a tension layer comprising a plurality of cables, each of which is formed from a plurality of strands. The tension layer has been designated by reference numeral 20. The belt is built up in the ordinary manner and is provided with an outer fabric covering 21 which is separated from the tension layer by a thin sheet of rubber composition. Between the tension layer and the narrow inner surface of the belt is a body 22 of rubber composition. It is to be understood that when the expression "rubber composition" is used, it is to be construed in a sense broad enough to include both natural and synthetic rubber, also any plastics that may be found suitable for use in belts. The belt itself is built up in the usual manner and may have a covering of bias cut fabric as is quite common. With long belts of the kind here under consideration, a number of belts are applied to the rollers 13 in the manner shown in Figure 1, with their wide surfaces towards the bottom of the grooves of the pulley as shown in Figure 3. The wide surfaces of the belts are in contact with the flat upper and lower surfaces of the center platen.

Referring now to Figure 2, it will be seen that the upper and lower surfaces of the bottom and top platen are provided with grooves 23 having the cross section of the finished belt. There are as many grooves as there are belts cured at one time and the rollers 13 have a groove corresponding to each groove in the platen. The center platen has openings 24 for steam and the upper and lower platens have openings 25 for steam. After the belt is positioned on the pulleys as shown in Figure 1, the pulleys are moved apart so as to put the belt under sufficient tension to keep the tension elements straight, after which the upper and lower platens are put into position and held against the center platen by a suitable means which have not been shown.

After the section in the molds has been subjected to the required heat for the necessary length of time, the mold is opened and new sections are moved into place in the mold. When the belt is first put into position, the body of the belt, which has been indicated by reference numeral 22, is uncured and quite soft and if the narrow surface is inside or placed in engagement with the roller, the tension of the cords will produce an inward movement in that part of the belt that is in contact with the pulley producing an offset. This displacement or offset in the tension layer will remain in the cured belt and will interfere with the operation and also makes it difficult to determine the exact length of the finished belt for the reason that the offset portions will straighten when subjected to tension during operation. This interferes with the length control and is highly objectionable. In addition to the inward curvature, it also sometimes happens that the layer will move unequally at opposite edges and result in positioning the tension layer at an angle to the outer and inner surfaces.

When the belt is positioned as suggested in this application, the distortion pointed out above cannot take place because the tension layer is quite close to the wide or outer surface and is separated from the fabric by a rather thin layer of rubber composition and therefore when cured in an inverted position, the tension layer will remain in the position planned; therefore the length can be accurately controlled and the finished belt will run smoothly due to the symmetrical arrangement of the tension layer along all parts of the cords length.

Although some parts of the mold have been illustrated, it is merely for the purpose of more clearly explaining the invention as this invention does not in any way relate to the construction of the mold but is directed specifically to the relationship of the belt with respect to the rollers and the mold during the curing operation.

The tension layer may be composed of stranded steel cables, cotton cords, rayon plastic, or any other suitable material and applicant does not limit himself to any of the materials mentioned or any other equivalent materials.

The wide surface of the belt is sometimes referred to as the outside or outer surface of the belt as distinguished from the sides or inner narrow surface.

Although the invention has been explained in connection with a belt of the V-type, it is not limited to this cross sectioned shape but is equally important with belts having rectangular cross sections.

Having described the invention what is claimed as new is:

1. The method of curing an endless power transmission belt of uncured rubber composition, having inner and outer surfaces and a tension layer of flexible cables positioned in the body adjacent the outer surface, which comprises the steps of, applying the belt to two axially parallel spaced rollers, with its outer surface in contact with the peripheral surfaces of the rollers, separating the rollers to put the belt under tension, whereby the flexible cables tend to move towards the side of the belt in contact with the rollers, and subjecting those portions of the belt between the rollers to a curing treatment.

2. The method of curing an endless power transmission belt of uncured rubber composition, having inner and outer surfaces and a tension layer of flexible cables positioned in the body adjacent the outer surface, which comprises the steps of, applying the belt to two axially parallel spaced rollers, with its outer surface in contact with the peripheral surfaces of the rollers, separating the rollers to put the belt under tension, whereby the flexible cables tend to move towards the side of the belt in contact with the rollers, subjecting those portions of the belt between the rollers to a curing treatment, turning the rollers to move the uncured portions into curing position and subjecting them to a curing treatment.

3. The method of curing an endless power transmission belt of uncured rubber composition, having a wide outer surface, a narrow inner surface, and a layer of flexible tension cables positioned in the belt body adjacent the wide side, which comprises the steps of applying the belt to two axially parallel spaced rollers with its wide surface in contact with the peripheral surfaces of the rollers, separating the rollers to put the belt under tension whereby the flexible cables tend to move towards the wide side of the belt, and subjecting the portions of the belt between the rollers to a curing treatment.

CHARLES WALTER YELM.

REFERENCES CITED

The following references are of record in the file of this patent:

UNITED STATES PATENTS

| Number | Name | Date |
| --- | --- | --- |
| 2,362,659 | Miller | Nov. 14, 1944 |
| 2,327,566 | Slusher | Aug. 24, 1943 |

Certificate of Correction

Patent No. 2,420,278. May 6, 1947.

CHARLES WALTER YELM

It is hereby certified that error appears in the above numbered patent requiring correction as follows: In the drawing, strike out Figures 4 and 5; and that the said Letters Patent should be read with this correction therein that the same may conform to the record of the case in the Patent Office.

Signed and sealed this 22nd day of July, A. D. 1947.

[SEAL]

LESLIE FRAZER,
*First Assistant Commissioner of Patents.*